United States Patent
Jones et al.

[15] 3,693,748
[45] Sept. 26, 1972

[54] MOTORCYCLE HELMET COMMUNICATION SYSTEM

[72] Inventors: Doyal H. Jones, 176 Barringron Rd.; Hanna Stibel, 88 Marborough Dr., both of Bloomfield Hills, Mich. 48031

[22] Filed: Nov. 10, 1971

[21] Appl. No.: 197,470

[52] U.S. Cl. .................................................181/20
[51] Int. Cl. .............................................G10k 11/12
[58] Field of Search ................181/20, 18; 179/156

[56] References Cited

UNITED STATES PATENTS

| 523,536 | 7/1894 | Leech | 181/20 |
| 1,656,914 | 1/1928 | Hart | 181/20 |
| 1,879,148 | 9/1932 | Fassett | 181/20 |
| 3,155,189 | 11/1964 | MacFarlane | 181/20 |

FOREIGN PATENTS OR APPLICATIONS

| 425,590 | 2/1926 | Germany | 189/20 |

*Primary Examiner*—Stephen J. Tomsky
*Attorney*—Bernard J. Cantor et al.

[57] ABSTRACT

A pair of motorcycle helmets worn by two riders on the same motorcycle are interconnected by a hollow, flexible tube, whose opposite ends are connected to an ear covering portion of each helmet. Each helmet also has a stiffer, speaking tube, having an end connected to the same helmet portion as the flexible tube, and an opposite end connected to a mouthpiece located just forwardly of the wearer's mouth. Thus, the two helmet wearers can talk to each other through the tubes as well as hear themselves talk.

4 Claims, 7 Drawing Figures

PATENTED SEP 26 1972 3,693,748

INVENTORS
DOYAL H. JONES.
HANNA STIEBEL.
BY CULLEN, SETTLE, SLOMAN & CANTOR.
ATT'YS.

3,693,748

MOTORCYCLE HELMET COMMUNICATION SYSTEM

BACKGROUND OF INVENTION

Where a motorcycle rider carries a passenger, it is almost impossible for the two to talk with each other while the motorcycle is in motion due to the noise, wind, etc. Even when the motorcycle is not in motion, it is difficult to orally communicate, particularly since most motorcycle riders are required by law to wear protective safety helmets, which helmets usually cover their ears. Hence, the one attempting to talk generally cannot hear himself, thus making communication more difficult. Moreover, the driver usually turns his head rearwardly to talk to his passenger, thereby turning his eyes from the road so that the danger of accident, while the motorcycle is moving, is considerably increased.

Hence, it is desirable to provide some means for the two passengers or riders on a motorcycle to orally communicate, without undue shouting and with the ability to hear themselves talk.

Radio connections between the two riders are totally impractical in the case of motorcycling due to, among other things, the bulk and weight of such radios, considerable cost of same, static, etc.

Hence, this invention relates to a communication system wherein the two helmets are interconnected by a sound transmitting tube, and each helmet has a talking tube which communicates to the ear at the same place as the sound transmitting tube, so that the speaker can hear himself simultaneously to his being heard by the other person. Helmets suitable for this purpose are called "full coverage" helmets. Examples of such helmets are found in U.S. Pat. No. 3,213,463 issued Oct. 26, 1965 to Marchello and in U.S. Pat. No. 3,471,865 issued Oct. 14, 1969 to Molitoris.

SUMMARY OF INVENTION

The invention herein contemplates interconnecting a pair of motorcycle helmets by a length of flexible sound transmitting tubing having its opposite ends connected by a hollow fitting to one of the ear portion of the helmet shell for communicating sound to the ears of the wearers of the helmet. In addition, each helmet is provided with a stiffer talking tube connected at one end to the same fitting as the flexible tube, and with its opposite end extending in front of the wearer's mouth and having a small hollow mouthpiece. The helmet wearers each can talk through the talking tube with the sound going to his ear as well as going through the flexible sound transmitting tube to the ear of his co-passenger.

Preferably, the flexible tube is formed in two coupled together sections, with the coupling formed in such a way as to disengage in the event of a pull upon the tube, so as to avoid the possibility of accidents where one helmet wearer moves any considerable distance from the other.

These and other objects and advantages of this invention will become apparent upon reading the following description of which the attached drawings form a part.

DETAILED DESCRIPTION

Figure 1:
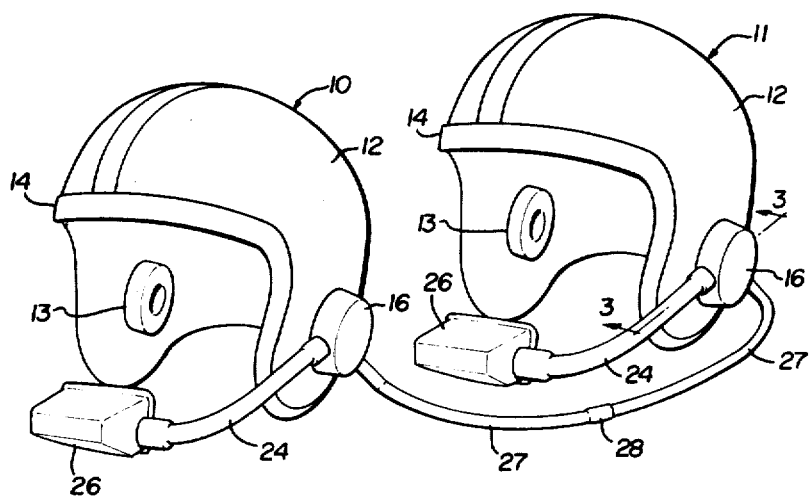
FIG. 1 is a perspective view of a pair of helmets interconnected by the communication system herein.
Figure 2:
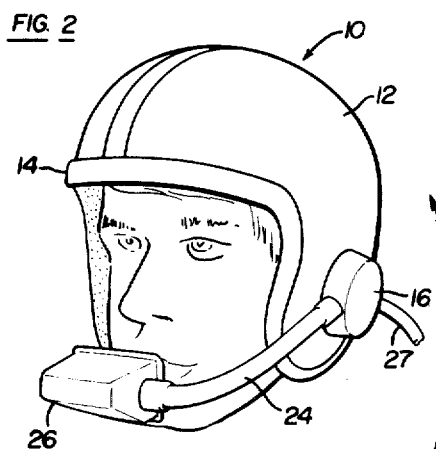
FIG. 2 is a perspective view of the forward rider.

FIG. 1 illustrates a pair of conventional hard shell, full coverage safety helmets conventionally used by motorcycle riders. The forward helmet 10 would normally be worn by the motorcycle driver and the rear helmet 11 would be worn by his passenger.

Each helmet is formed of a conventional hard outer shell 12, having ear pads 13 arranged within the shell to cover the ear areas of the wearer and conventional rubber-like edge beads 14 which trims the shell edges.

Figure 3:
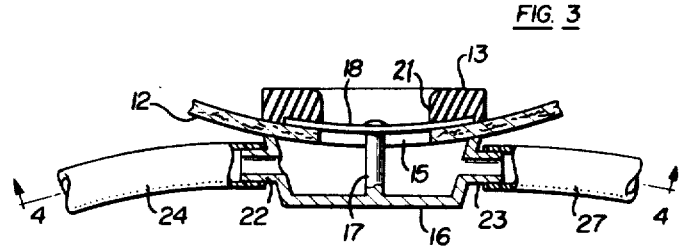
FIg. 3 is an enlarged, fragmentary, cross-sectional view taken in the direction of arrows 3—3 of FIG. 1.
Figure 4:
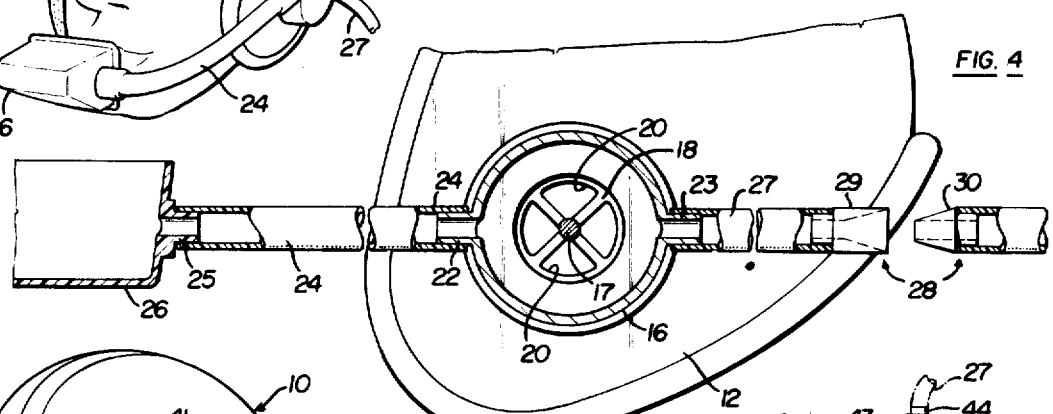
FIG. 4 is an enlarged, fragmentary cross-sectional view of the forward mouthpiece, talking tube, helmet connection, flexible tube and its coupling.

The invention herein contemplates cutting a hole 15 into one side of each of the helmet shells in approximately the vicinity of one of the wearer's ears (see FIG. 3). A cup shaped fitting 16 covers the hole and is fastened to the shell, by a suitable fastener, as for example, by means of a stud 17 secured at one end to the central portion of the cup, and at its opposite end to a disk 18, having perforations or openings 20. The peripheral edge of the disk is positioned against the shell and beneath the ear pad to thus fasten the cup to the shell. An opening 21 may be formed in the ear pad for better sound transmission therethrough. Integral tubular extensions 22 and 23 are formed on the wall of and open into the cup 16.

A relatively stiff talking tube 24, such as a suitable plastic which is self-sustaining in shape, but will readily yield under impact, has one end frictionally fitted over and connected to the cup extension 22. The tube opposite end fits over a tubular extension 25 which is formed on and opens into a box-like, trough shaped mouthpiece 26 which opens towards the mouth of the wearer of the helmet.

A sound transmitting flexible tube 27 interconnects the cups on the forward and rear helmet. Each end of this tube fits over and is secured to the cup tubular extensions 23. Preferably, the tube 27 is split into two sections joined by a coupling 28, each of whose halves 29–30 are secured to one of the sections for frictionally interengaging. The coupling 18 are of the type whose halves pull apart or disengage upon a longitudinal pull.

Any suitable form of coupling may be used here, which is of a quick release type when a pull is exerted upon the flexible tube. The purpose of this is to disengage the two tubes and thus disengage the two helmets from each other in the event one of the helmet wearers suddenly moves away from the other.

In operation, when the two riders mount the motorcycle, the two flexible tube sections are coupled together. Thereafter, the riders may talk to each other merely be speaking normally into their respective mouthpieces 26 with the sound carrying through their respective tube 24, the cup 16 and the flexible tube 27 so that each not only hears the other but also hears himself talk.

Where only one rider is using the motorcycle, he may pull the flexible tube 27 off the tubular extension 23 on his helmet cup 16 and do without it until such time as he needs it.

MODIFICATION OF FIGS. 5–7

Figure 5:
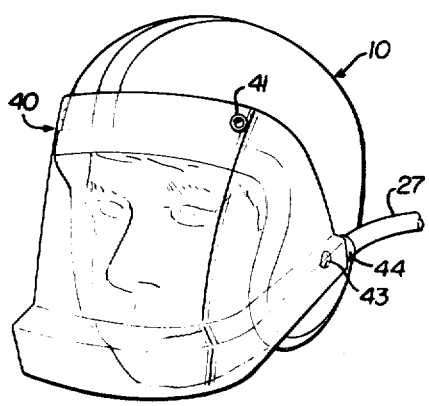
FIg. 5 is a perspective view of a modification wherein the talking tube and mouthpiece are formed as part of a helmet face shield.
Figure 6:
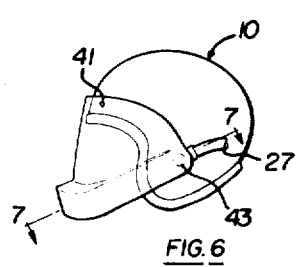
FIG. 6 is a side view of the modification of FIG. 5.

FIGS. 5–6 illustrate a modification wherein the mouthpiece, talking tube and cup are formed integral with a conventional plastic face shield 40 which is fastened to the helmet shell by conventional snap fasteners 41. The shield lower portion is bent or molded into a continuous channel 42 which thus functions as the mouthpiece, tube and cup, communicating with an opening 43 cut in the shell at the ear location.

Figure 7:
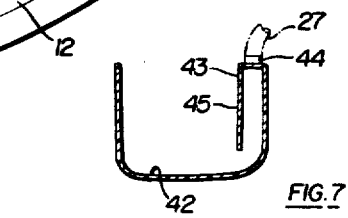
FIG. 7 is a cross-sectional view of the face shield taken on arrows 7—7 of FIG. 6.

A tubular extension 44, similar to cup extension 23 is used to connect the end of the flexible tube 27 to the channel near the ear opening 43. The channel may be open or alternatively a cover strip 45 (see FIG. 7) may be arranged over the inside of the shield to cover the channel area between the wearer's mouth and the ear opening.

While the invention herein is described in connection with motorcycle rider helmets, it likewise is applicable to other vehicles, such as snowmobiles, where a motorcycle type helmet is worn.

Having fully described an operative embodiment of this invention, I now claim:

1. A communication system for a motorcycle helmet, comprising a pair of spaced apart, full coverage, hard shell safety helmets which cover the head and ears of the wearer;

each helmet having a hollow ear communicating cup-portion fastened upon and opening through its shell at one ear covering portion thereof;

each helmet having a stiff talking tube portion having one end fastened to and opening into its cup portion, and an opposite end extending to the front forward portion of the helmet and opening into a mouthpiece portion arranged for positioning in front of the mouth of the helmet wearer;

and a flexible sound transmitting tube having its opposite ends secured to and opening into each of said cup portions, whereby the wearers of the two helmets, when riding upon a motorcycle together, may talk into their respective mouthpieces and the sound will be simultaneously transmitted to and heard by both of them through their respective fittings.

2. A device as defined in claim 1, and said flexible tube being formed in two sections coupled end to end by a coupling arranged between and releasably connecting the adjacent ends of said flexible tube;

said coupling including means for releasing the two adjacent coupled tube section ends upon a longitudinal pull applied to said tube sections.

3. A device as defined in claim 2, and said mouthpiece being in the form of an open, box-like trough, opening towards the mouth of the helmet wearer.

4. A device as defined in claim 1 and each helmet having a transparent face shield secured to and covering the face opening of the helmet;

and an integral continuous channel formed in the lower portion of the face shield and opening towards the wearer's mouth to his ear area, and said channel forming said cup portion, talking tube portion and mouthpiece portion.

* * * * *